(12) United States Patent
Borthakur et al.

(10) Patent No.: US 12,353,480 B2
(45) Date of Patent: Jul. 8, 2025

(54) EFFICIENT EXECUTION OF DATABASE QUERIES ON STREAMING DATA

(71) Applicant: Rockset, Inc., San Mateo, CA (US)

(72) Inventors: Dhruba Borthakur, Sunnyvale, CA (US); Venkat Venkataramani, San Mateo, CA (US); Tudor Bosman, Hayward, CA (US); Igor Canadi, San Francisco, CA (US); Kshitij Wadhwa, San Mateo, CA (US); Karen Li, San Mateo, CA (US); Shruti Bhat, Newark, CA (US)

(73) Assignee: Rockset, Inc., San Francisco, CA (US)

( * ) Notice: Subject to any disclaimer, the term of this patent is extended or adjusted under 35 U.S.C. 154(b) by 0 days.

(21) Appl. No.: 18/213,702

(22) Filed: Jun. 23, 2023

(65) Prior Publication Data

US 2024/0028648 A1    Jan. 25, 2024

Related U.S. Application Data

(60) Provisional application No. 63/390,854, filed on Jul. 20, 2022.

(51) Int. Cl.
*G06F 7/00*    (2006.01)
*G06F 16/903*    (2019.01)
*G06F 16/906*    (2019.01)

(52) U.S. Cl.
CPC ...... *G06F 16/906* (2019.01); *G06F 16/90335* (2019.01)

(58) Field of Classification Search
CPC ............. G06F 16/906; G06F 16/90335; G06F 16/248; G06F 16/283; G06F 16/244; G06F 16/2425; G06F 16/24556; G06F 16/24539; G06F 16/24542
See application file for complete search history.

(56) References Cited

U.S. PATENT DOCUMENTS 6,438,538 B1 * 8/2002 Goldring ........... G06F 16/24556
11,030,242 B1    6/2021 Borthakur et al.
(Continued)

OTHER PUBLICATIONS

Bhushan, V., "Rollups on Streaming Data: Rockset vs Apache Druid," Rockset, Inc., Aug. 25, 2021, pp. 1-10.
(Continued)

*Primary Examiner* — Mohammad A Sana
(74) *Attorney, Agent, or Firm* — Keller Preece PLLC

(57) ABSTRACT

A database system receives a database language query specifying a grouping clause and one or more aggregate result values. The database system generates a pre-aggregation table based on the query. The database system generates an ingest query configured to generate data for populating the pre-aggregation table and a completion query configured to processes data stored in the pre-aggregation table. The database system periodically receives a set of input records and executes the ingest query to generate a set of pre-aggregation records. The set of pre-aggregation records are combined with the pre-aggregation table. The database system executes the completion query on the data stored in the pre-aggregation table to generate a result set and sends the generated result set to the requestor of the results.

20 Claims, 7 Drawing Sheets

(56) References Cited

U.S. PATENT DOCUMENTS

| | | | | |
|---|---|---|---|---|
| 11,675,767 | B1* | 6/2023 | Behm | G06F 16/244 |
| | | | | 707/747 |
| 2012/0173519 | A1* | 7/2012 | Buessow | G06F 16/24539 |
| | | | | 707/E17.014 |
| 2021/0224257 | A1* | 7/2021 | Fender | G06F 16/24534 |
| 2023/0073666 | A1* | 3/2023 | Li | G06F 16/2425 |

OTHER PUBLICATIONS

Borthakur, D., "Aggregator Leaf Tailer: An Alternative to Lambda Architecture for Real-Time Analytics," Rockset, Inc., Feb. 6, 2019, pp. 1-9.

Venkataramani, V., "How Rockset Enables SQL-Based Rollups for Streaming Data," Rockset, Inc., Aug. 31, 2021, pp. 1-9.

Youtube.com, "How We Built SQL Rollups on Streaming Data," Rockset, Inc., Oct. 29, 2021, one page, [Online] [Retrieved on Jun. 5, 2024] Retrieved from the Internet <URL: https://www.youtube.com/watch?v=u56_vDF3ciQ>.

* cited by examiner

EFFICIENT EXECUTION OF DATABASE QUERIES ON STREAMING DATA

CROSS-REFERENCE TO RELATED APPLICATIONS

This application claims the benefit of U.S. Provisional Application No. 63/390,854, filed on Jul. 20, 2022, which is incorporated by reference in its entirety.

FIELD OF INVENTION

This disclosure relates generally to efficient execution of database queries, and more specifically to efficient execution of database queries on streaming data.

BACKGROUND

Enterprises generate large amount of data on a continuous basis. For example, data may be generated by various systems via event logs, sensors, user interactions, for example, transactions executed as a result of user actions. Enterprises often perform analytical queries on such data, for example rollup operations that aggregate data over various attributes. Due to continuous updates of the data, users often want to see updated results of the analytical queries on a regular basis. For example, a user may want to see an updated result of the analytical query on a daily basis or a weekly basis. Analytical queries often process large amount of data, for example, all the data received during a significant time interval such as past month or past year. If several thousand records are received every second, the amount of data processed by such queries can be extremely large. Execution of such queries can be highly computation intensive process and can be very slow. Furthermore, the system has to store very large amount of data in a storage system that has fast access to allow the analytical queries to execute efficiently. This makes the system expensive and still results in slow execution of the queries.

SUMMARY

The above and other issues are addressed by a computer-implemented method, computer system, and computer readable storage medium for processing queries that perform grouping. A database system receives a request including a database language query, for example, a structured language query (SQL query). The received query specifies a grouping clause and one or more aggregate result values based on grouping sets generated by the grouping clause. The database system may receive explicit request to calculate results of the query or receive a request to evaluate the query on a periodic basis, for example, every day or every week. The database system generates a pre-aggregation table based on the query. The pre-aggregation table is populated based on incoming data on a periodic basis. The database system generates following queries based on the received query: (1) an ingest query configured to generate data for populating the pre-aggregation table, and (2) a completion query configured to processes data stored in the pre-aggregation table to obtain results of the query. The database system periodically receives a set of input records and executes the ingest query to generate a set of pre-aggregation records. The set of pre-aggregation records are combined with the pre-aggregation table. The database system executes the completion query on the data stored in the pre-aggregation table to generate a result set and sends the generated result set to the requestor of the results.

According to an embodiment, the database system combines the set of pre-aggregation records with the pre-aggregation table as follows. For each pre-aggregation record, the database system determines whether there is a record in the pre-aggregation table corresponding to the pre-aggregation record. If the database system determines that there is a record in the pre-aggregation table corresponding to the pre-aggregation record, the database system updates the record in the pre-aggregation table based on the pre-aggregation record. If the database system determines that there is no record in the pre-aggregation table corresponding to the pre-aggregation record, the database system inserts a record in the pre-aggregation table based on the pre-aggregation record.

According to an embodiment, the database system determines whether there is a record in the pre-aggregation table corresponding to the pre-aggregation record by identifying a record in the pre-aggregation table that has grouping dimensions that match the grouping dimensions of the pre-aggregation record. The database system may identify the record in the pre-aggregation table that has grouping dimensions that match the grouping dimensions of the pre-aggregation record by determining a hash value based on the grouping dimensions for the records of the pre-aggregation table and comparing with a hash value of the grouping dimensions of the pre-aggregation record.

Embodiments of a computer readable storage medium store instructions for performing the steps of the above methods. Embodiments of the computer system comprise one or more computer processors and a computer readable storage medium store instructions for performing the steps of the above methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
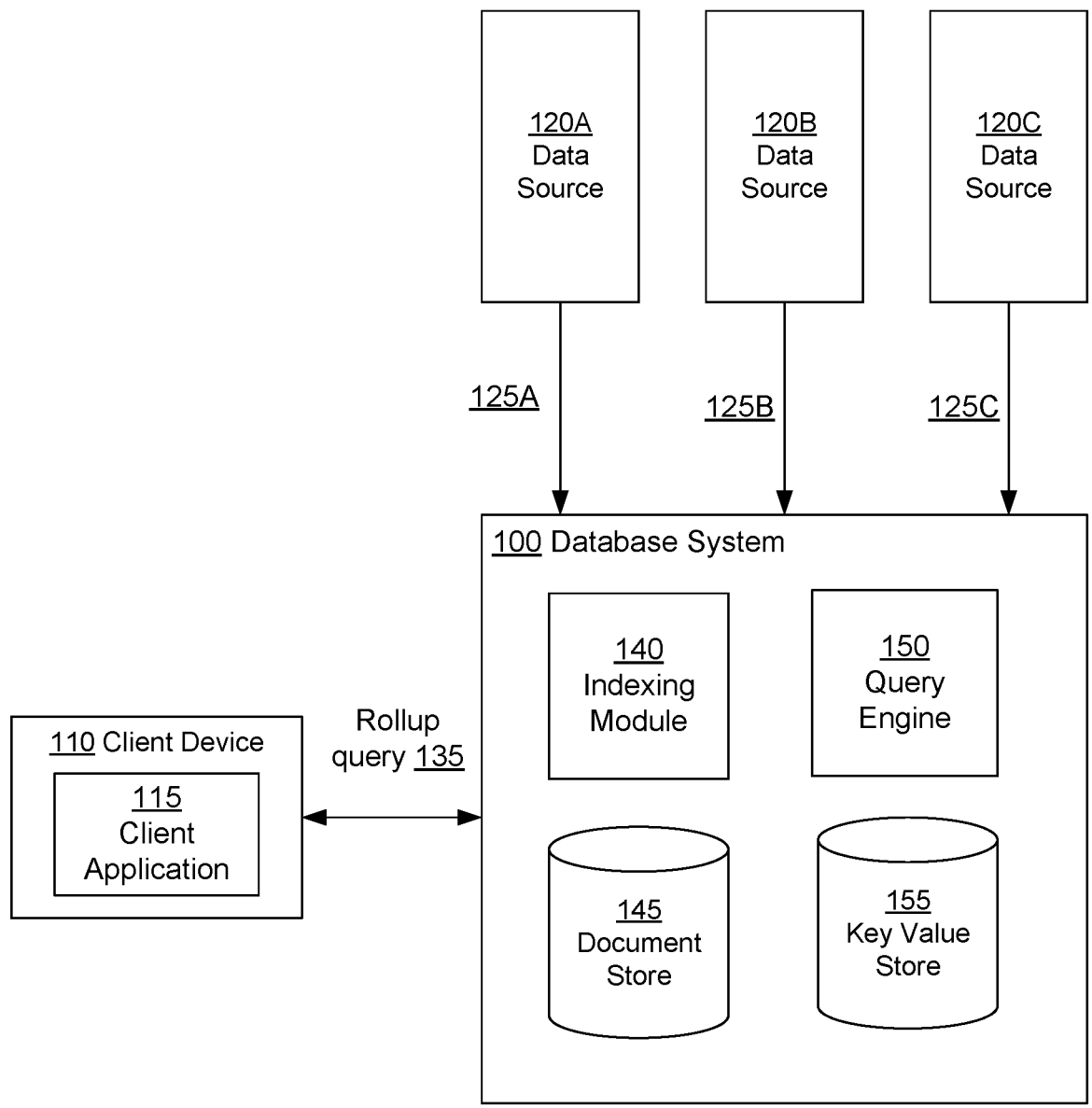
FIG. 1 is a block diagram of a system environment 105 for executing queries, in accordance with an embodiment.

FIG. 1 is a block diagram of a system environment 105 for executing queries, in accordance with an embodiment. The system environment 105 comprises the database system 100, one or more client devices 110, and one or more data sources 120A, 120B, 120C. Other embodiments may have more of fewer systems within the system environment 105. Functionality indicated as being performed by a particular system or a module within a system may be performed by a different system or by a different module than that indicated herein.

The database system 100 receives 125A, 125B, 125C data from each of the data source 120A, 120B, 120C. The data may be received in various forms. For example, a data source may be a server that provides data streams based on events that occur in the server. As another example, a data source may be a transactional system that provides data as change logs representing operations performed by the transactional system. The operations performed by the transactional system may represent changes to data, for example, addition of records, modifications of records, or deletion of records.

The database system 100 comprises modules including an indexing module 140, a document store 145, a key value store 155 and a query engine 150. Other embodiments can include more or fewer modules in the database system 100. Functionality indicated as being performed by a particular module may be performed by other modules. Certain modules can be executed in a parallel or distributed fashion using multiple processors.

According to an embodiment, the database system 100 receives data from data sources 120 and stores them in document store 145 as documents comprising semi-structured data. The database system executes analytical queries, for example, rollup queries. The rollup query may be received 135 from a client device. A rollup query referred to herein represents a database query that specifies a grouping clause for performing grouping by one or more columns of a table. The rollup query also specifies one or more aggregation operations for computing the results for each grouping set generated based on the grouping clause. The database system supports expressions of aggregate functions as results. In an embodiment, the database system receives a request specifying a rollup query and includes instructions to execute the rollup query on a periodic basis, for example, once every day or once every week. The database system allows processing of rollup queries that specify grouping clause that groups a plurality of columns. The rollup query may include one or more results based on aggregation of each of the plurality of columns. The database system allows processing of rollup queries that specify grouping clause that groups by columns other than time dimension, for example, grouping by location or other categories.

Following example illustrates is the format of a rollup query that the system processes.

```
SELECT
    dimension1, dimension2, ... <more dimensions> ... '
    agg_functionl (measure1 ) , ... agg_function2 (measure2 ), <more measures> ...
FROM
    _input
GROUP BY
    dimension1, dimension2, .... <rest of the dimensions> ...
```

The query includes a group by clause that specifies a set of dimensions including dimension1, dimension2, and other dimensions. The query includes a select clause that returns results of the execution of queries. The result of execution of the query may include one or more dimensions including dimension1, dimension2, and so on as well as aggregate functions such as agg_function1, agg_function2, and so on. Examples of aggregate functions include MAX (maximum), MIN (minimum), AVG (average), COUNT (count), DISTINCT (determine distinct values), and so on. The result of the query may be an expression that composes multiple functions.

The following is an example of a rollup query that may be received and processed by the database system. The rollup query illustrates an example of expressions based on aggregate functions.

```
SELECT
    DATE_ TRUNC ('hour', PARSE_ TIMESTAMP(ts)) AS event._time, location,
    SUM (event1_count) AS num_event1
    MAX (event1_count + event2_count) AS event_count
    AVG (event1_count) * APPROX_DISTINCT (event2_count ) as metric
FROM input
GROUP BY event_time, location
```

The query processes data that includes values for different types of events including event1 and event2. The expression DATE_TRUNC ('hour', PARSE_TIMESTAMP(ts)) determines the current hour and returns that as the event time value. The query performs group-by operation based on two dimensions, event time and location. A dimension may be referred to herein as a column or attribute or field. Accordingly, a result record may be returned for each combination of hour and location. Each result record includes a SUM (event1_count) representing the number of occurrences of event1, MAX (event1_count+event2_count) representing the maximum number of the total of event1_count and event2_count, and AVG (event1_count)*APPROX DISTINCT (event2_count) representing a complex expression returned as a metric value. Each result record is returned for a grouping set corresponding to a combination of values of event time and location dimensions.

This rollup query is provided as an example, and the database system can process queries that are different and more complex. For example, the above query performs group-by operation based on two dimensions, whereas other queries may perform group by using a single dimension or more than two dimensions. A dimension specified for a group-by clause by a rollup query may be time dimension but is not required to be time dimension. For example, the dimensions specified by the group-by clause may be zip code, age of person, or any other category (or field) having a set of distinct possible values. The rollup query may specify one or more dimensions for group by clause, none of which are time dimensions.

The database system 100 may receive data from multiple data sources 120 and allow users to process database queries for each data source as well as database queries that process data collected across the data sources. The database system 100 may receive data as records from relational databases and convert them into documents and store them in the document store 145. For example, the database system 100 may convert each row of a table into a document and store the document in the document store 145. The database system 100 may receive documents sent by applications executing on systems such as client devices 110. The database system 100 creates indexes based on the retrieved documents to allow efficient querying using the documents.

According to an embodiment, the database system 100 stores information describing records as semi-structured documents. The database system 100 performs queries across semi-structured data although the techniques disclosed herein can be used for structured and unstructured data. Semi-structured data is a form of structured data that does not conform to a formal structure of data, for example, schemas of relational databases. Semi-structured data may include documents that contains metadata such as tags or other markers to separate various elements of the documents and enforce hierarchies of records and fields within the document. Semi-structured data can be represented using a particular type of format, for example, hypertext markup language (HTML), the extensible markup language (XML), JAVASCRIPT object notation (JSON), PDF, MICROSOFT WORD, documents based on comma separated variable (CSV), tab-delimited text files, and so on. A semi-structured document is a document that stores semi-structured data.

A semi-structured document includes one or more fields. A field may also be referred to as an attribute. In an embodiment, a semi-structured document is represented as key-value pairs. A field comprises field data, for example, a field name, a field value, and a field type. For example, a semi-structured document representing data describing a person may include a field with name "first name", a field value "Jack" and field type "string".

Different semi-structured documents may have different fields. Furthermore, a field with the same name in two different semi-structured documents may store data of different types. For example, a document D1 may have fields a1 and a2 whereas document D2 may have fields a1 and a3. Furthermore, the field a1 in document D1 may store data of type integer whereas field a1 in document D2 may store data of type string.

The database system 100 is configured to automatically sync data from various data sources and continuously index them in the key-value store 155. The queries processed by the query engine 150 return the appropriate results available in the key-value stores when the query is executed. For example, a query that requests documents matching a criteria may be received at time T1 and again at time T2. The query execution at time T1 may return a set S1 of documents. However, if the database system 100 receives additional records from the data sources 120 between the time T1 and time T2, the execution of the query at time T2 may return a set S2 that reflects any matching documents received between the time T1 and T2.

The indexing module 140 creates indexes used by the query engine 150 for performing efficient queries for data stored in the documents. The indexing module 140 stores the generated indexes in the key-value store 155. The indexing module 140 receives semi-structured documents comprising fields and adds key-value pairs based on fields of the documents in the key-value store 155. In an embodiment, a key is represented as a string. A key-value pair stored in the key-value store 155 is also referred to herein as a record. The key-value store 155 stores a plurality of indexes based on the documents received. In an embodiment, the key-value store 155 stores key-value pairs in a sorted order of keys, for example, alphabetically sorted order.

The query engine 150 receives queries from client applications 115 executing on client devices 110. The query may be specified using a query language such as the structured query language, SQL. The query engine 150 processes a received query using indexes stored in the key-value store 155 and returns the results to the client application 115 that sent the query.

The key-value store 155 allows the database system 100 to store semi-structured data that does not conform to a rigid schema. For example, documents with different fields can be added to the key-value store by splitting each document into individual key-value pairs, each key-value pair representing a field. In contrast, a relational database requires all records to have the same structure to be able to be added to a table. Furthermore, the key-value store 155 allows efficient searches for keys, for example, keys matching a given prefix. The indexing module 140 creates indexes having different key structures that allow different types of queries to be executed efficiently. As a result, the database system 100 is able to perform more efficient querying than a query engine that uses a simple inverted index that maps keywords to documents.

According to some embodiments, the database system 100 creates different types of indexes to perform different types of queries. Examples of different types of queries include: query for documents that have fields having a particular name and particular value, query for fields of a given document having a document identifier, query to aggregate data of fields matching a given criteria, and so on. Each index created by the database system 100 combines field data and/or document identifiers in a particular order to generate key-value pairs for the index. The order in which field data and document identifier are combined for an index allow efficient execution of a particular type(s) of queries.

The system environment 105 may include multiple client devices 110. A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise datacenter. The client device executes a client application 115 for interacting with the database system 100, for example, a browser. Although, FIG. 1 shows two client devices, the system environment 105 can include many more client devices 110.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

A network (not shown in FIG. 1) enables communications between various systems within the system environment 105, for example, communications between the client device 110 and the database system 100, communications between the data sources 120 and the database system 100, and so on. In one embodiment, the network uses standard communications technologies and/or protocols. The data exchanged over the network can be represented using technologies and/or formats including, the HTML, the XML, JSON, and so on.

Although a particular key-value store based architecture of the database system is described herein as an embodiment, the techniques for processing the queries are not limited to the key-value store based architecture and may be implemented using other types of database system architectures. Systems and methods for indexing and querying semi-structured documents using a key value store are described in U.S. patent application Ser. No. 16/160,477 filed on Oct. 15, 2018, issued as U.S. Pat. No. 11,030,242 on Jun. 8, 2021, each of which is incorporated by reference herein in its entirety. Systems and methods for querying data of transactional systems using a database system are described in U.S. patent application Ser. No. 16/812,923 filed on Mar. 9, 2020, which is incorporated by reference herein in its entirety.

System Architecture

Figure 2:
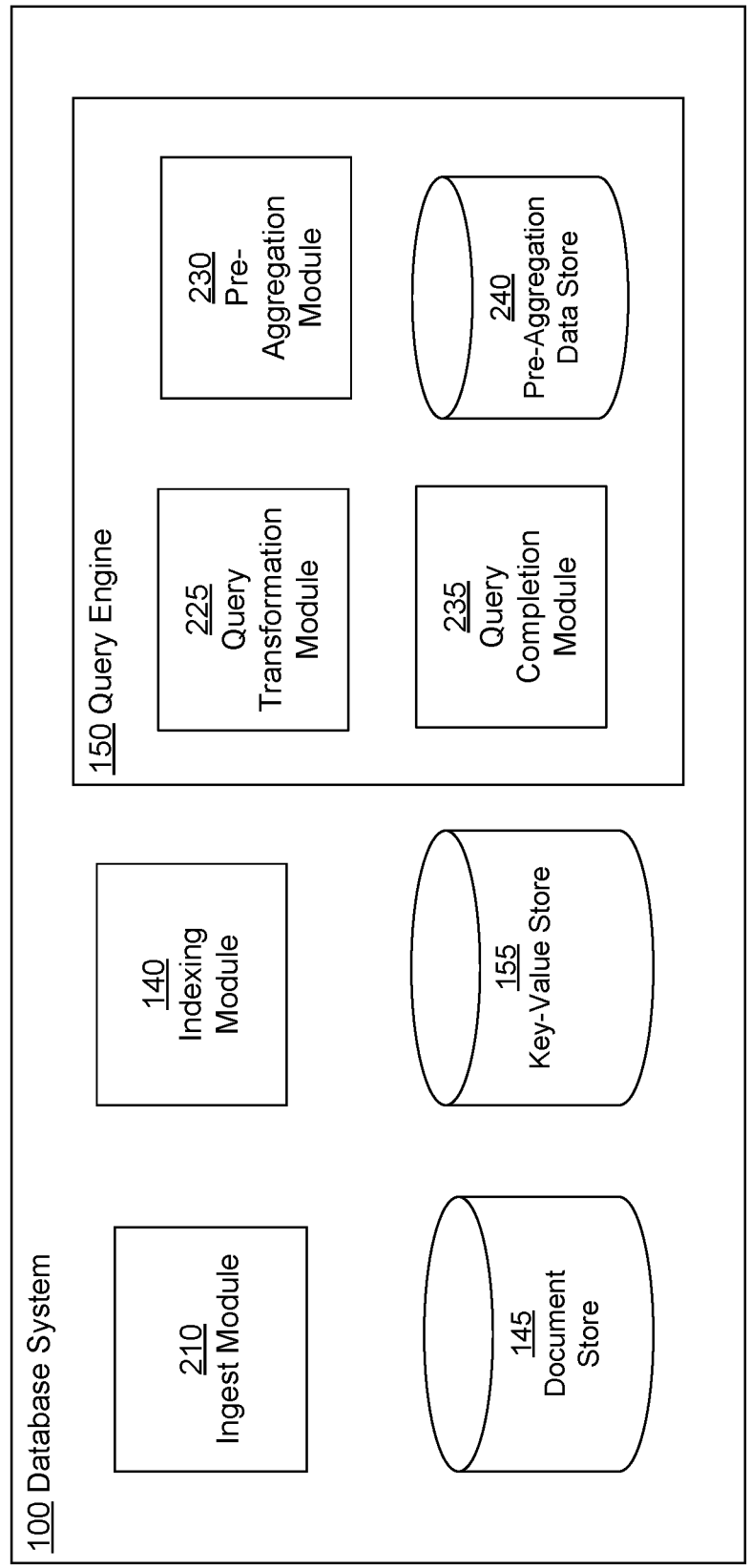
FIG. 2 shows the system architecture of a database system, in accordance with an embodiment.

FIG. 2 shows the system architecture of a database system, in accordance with an embodiment. The database system 100 comprises an ingest module 210, the indexing module 140, the document store 145, the key-value store 155, and the query engine 150. Other embodiments of the database system 100 may include more of fewer modules. The database system 100 may be referred to herein as a real-time analytical database system.

The ingest module 210 interfaces with data sources 120 that provide data, for example, transactional systems, cloud storage systems, or third-party systems. The ingest module 210 may receive change logs from the transactional systems. The change logs correspond to operations performed using data in the transactional system. The operations represented by change logs may represent changes to data stored in the transactional system, for example, addition of new records, deletion of existing records, updates of existing records, and so on.

The documents stored in the document store 145 by the ingest module 210 may comprise structured data, unstructured data, or semi-structured data received from external systems. In an embodiment, the ingest module 210 imports multiple records in parallel using multiple processors. The ingest module 210 scales the number of processors used for importing the records based on the number of records that need to be imported.

The query engine 150 receives queries and processes them to identify matching data. The query engine 150 comprises a query transformation module 225, a pre-aggregation module 230, a query completion module 235, and a pre-aggregation data store 240. Other embodiments of the query engine 150 may include more or fewer modules.

The query engine 150 executes a rollup query by performing two sets of computations, referred to as computation C1 and computation C2. The computation C1 of the rollup query is performed at data ingest time. The result of the processing for the rollup query performed at the data ingest time is stored in a pre-aggregation table. In an embodiment, the records of the pre-aggregation table are stored as documents such that one document represents one aggregation group based on the grouping dimensions.

The pre-aggregation data store 240 stores the pre-aggregation table. The remaining computation C2 for execution of the rollup query is performed when results of the rollup query are requested. The remaining computation C2 receives the data stored in the pre-aggregation table as input and generates the final result of the rollup query that is returned to the requester of result. The pre-aggregation store 240 may store several pre-aggregation tables, one for each rollup query that the database system is executing on a periodic basis. Each of the pre-aggregation may be updated on a periodic or continuous basis as input data is received by the system, for example, as part of data streams processed by the database system.

Since a rollup query may be executed on a periodic basis, the database system keeps the pre-aggregation data for the rollup query stored and continuously updated as long as the rollup query needs to be executed. In an embodiment, the user provides explicit instructions to stop executing the rollup query. In another embodiment, the user provides a start date and an end date as the duration during which the rollup query is executed. Once the database system determines that a particular rollup query does not need to be executed, the database system may delete the pre-aggregation table corresponding to that particular rollup query.

The query transformation module 225 receives a rollup query and generates queries and commands by transforming the rollup query. In an embodiment, the query transformation module 225 generates a command to generate a pre-aggregation table based on the rollup query. The query transformation module 225 also generates an ingest query that represents the computation C1 and a completion query that represents the computation C2.

The pre-aggregation module 230 executes the ingest query to perform the computation C1 on input data that is received. The pre-aggregation module 230 executes the ingest query periodically. The pre-aggregation module 230 stores the result of execution of the ingest query in the pre-aggregation table.

The query completion module 235 executes the completion query to perform the computation C2 for returning the result of the rollup query when requested. In an embodiment, the system receives a request to execute the rollup query on a periodic basis, for example, every day, every week, or every month. The completion query is executed at the rate at which the user has requested execution of the rollup query.

In an embodiment, the computations C1 performed by the ingest query at data ingest time include, computing partial state of aggregate functions, computing simple expressions such as simple arithmetic expressions, the WHERE clause that filters incoming rows, the GROUP BY clause that specifies grouping dimensions by which records are grouped. In contrast, the computations C2 performed by completion query at time of evaluation of the rollup query include, finalizing aggregate functions, computing complex expressions, for example, expressions based on results of aggregate functions, and HAVING clause. The partial state of an aggregate function may be stored using multiple fields. For example, the partial state of AVERAGE aggregate function is stored by storing a SUM value that stores the sum of a values of column for a group and a COUNT value storing the number of rows in a group. The SUM and COUNT values are stored as columns of the pre-aggregation table. The AVERAGE value is computed by the completion query based on the SUM and COUNT value. For example, the completion query further adds the SUM values to determine a final SUM value and adds the COUNT values to determine a final COUNT value and then divides the final SUM by the final COUNT value to determine the resulting AVERAGE value. The partial state of MIN (minimum) aggregate function is stored using a field that stores the minimum value of the column for the group. The partial state of MAX (maximum) aggregate function is stored using a column of the pre-aggregation table that stores the maximum value of the field for the group. Similarly, the partial state of SUM (sum) aggregate function is stored using a column of the pre-aggregation that stores the sum value of the column for the group.

The database system determines the frequency at which the ingest query is executed. The database system may determine the frequency at which the ingest query is executed based on various factors, for example, the rate at which the rollup query needs to be executed and rate at which data is received by the data base system that needs to be processed by the rollup query. The rate R1 at which the database system executes the ingest query may be different from the rate R2 at which the rollup query is executed. In an embodiment, the database system executes the ingest query at a higher frequency than the rate at which the rollup query is executed. For example, if a large amount of data is being received, the database system may execute the ingest query every few seconds or every minute, whereas the completion query may be executed at a slower rate, for example, once every hour.

The query engine may include a query parser that parses a received query to determine various components (or clauses) of the query, for example, the group by clause, the aggregation clause, the select clause, and so on. The query parser generates a data structure representing the query. The generated data structure allows efficient access to information describing the query. In an embodiment, the queries processed by the database system 100 are based on the structured query language (SQL). The query engine may include an execution engine that executes the query. In an embodiment, the query engine generates an execution plan corresponding to a query and the execution engine executes the execution plan.

In an embodiment, each record received by the ingest module 210 has an identifier. The identifier may be stored as a field of the document. The identifier is provided by the source of the record, for example, by the data source 120 that provided the data.

The ingest module 210 converts records received from external systems into documents that are stored in the document store 145. Accordingly, if the ingest module 210 receives a record representing a row of a table, the ingest module 210 generates a document in which each field corresponds to the fields of the row. The ingest module 210 saves the generated document into the document store 145.

The document store 145 stores documents representing records imported by the ingest module 210. The document store 145 acts as a staging area for documents for further processing by the database system 100. In an embodiment, the document store 145 is implemented as a distributed log store that stores logs across a plurality of systems. New documents received by the database system 100 are added to the end of a log. Adding documents to the end of a log is efficient compared to inserting documents in the middle of a file. This is so because adding data in the middle of a file may require moving of existing data in addition to writing the data that was received. In contrast, appending data at the end of a log file can be performed simply by writing the data without requiring any additional data movement. The documents stored in a log are ordered based on the time that each document was added to the log.

The indexing module 140 processes the transformed documents and adds key-value pairs based on field data extracted from the transformed documents to multiple indexes that are stored in the key-value store 155. The key-value store 155 stores the key-value pairs in a sorted order, for example, in order of alphabetically sorted keys. Each index is associated with an order in which values of field data and document identifier are combined to obtain the keys of the key-value pairs added to the index. The query engine 150 generates key-expressions based on the order in which values are combined and uses the key-expressions to perform prefix searches for specific key-value pairs of that index.

In an embodiment, the key-value store 155 includes a document index configured to allow efficient processing of queries that determine documents that match a given criteria based on field data, a field index configured to allow efficient processing of queries that access fields of a given document, and a columnar index configured to allow efficient processing of queries that aggregate fields of documents. The database system 100 may use multiple indexes to efficiently process a query, for example, both the document index and field index may be used to access a field "A1" from all documents that match a specified criteria based on field "A2". In an embodiment, the ingest module 210 receives a request to store a modified version of a document that was previously imported.

Each index comprises key-value pairs that are stored in the key-value store 155. In an embodiment, the keys corresponding to a particular index include a sub-string that identifies the index. Accordingly, the keys corresponding to the key-value pairs of the document index include a document index identifier, for example, the string "I", the keys corresponding to the key-value pairs of the field index include a field index identifier, for example, string "S", and the keys corresponding to the key-value pairs of the columnar index include a columnar index identifier, for example, string "D".

The document index is an inverted index that allows accessing documents that satisfy certain criteria based on field data. Each key of a key-value pair of the document index is generated by concatenating the following values in the following order: the document index identifier, the field name, the field type, the field value, and the document identifier. Other embodiments may generate the keys by concatenating fewer elements than those listed herein. Furthermore, the elements listed above may be concatenated in an order different from the order listed above to generate the key for the document index. For example, the order of the field data may be changed. However, for the document index, the field data occurs before the document identifier in the keys. The value of the key-value pair for the document index is empty.

The field index is a forward index that contiguously stores all fields of a document. Each key of a key-value pair of the field index is generated by concatenating the following values in the following order: field index identifier, the document identifier, and the field name. Other embodiments may generate the keys by concatenating fewer elements than those listed herein. Furthermore, the elements listed above may be concatenated in an order different from the order listed above to obtain the key for the field index. The value of the key-value pair for the field index is the field value.

The columnar index stores data in columnar fashion by contiguously storing values of the same field across different documents. Each key of a key-value pair of the columnar index is generated by concatenating the following values in the following order: the columnar index identifier, the field name, the field type, and the document identifier. Other embodiments may generate the keys by concatenating fewer elements than those listed herein. Furthermore, the elements listed above may be concatenated in an order different from the order listed above to obtain the key for the columnar index. The value of the key-value pair for the columnar index is the field value.

In an embodiment, the key-value store 155 supports various APIs (application programming interfaces) that allow other modules or systems to interact with the key-value store 155. For example, the key-value store 155 supports a seek( ) and a get( ) API. The seek( ) API takes as input a string representing a prefix of keys and positions a read cursor to the first key in the key-value store that has the closest prefix to the input string. The seek( ) operation provides an efficient mechanism to access the appropriate keys in a key-value store. The key-value store stores the key-value pairs in a sorted order of the keys, for example, sorted in a lexicographical, alphabetical, or any other known and predetermined order. Since the key-value pairs are stored in a sorted order, the seek( ) operation is performed using an efficient search technique such as binary search to efficiently locate the matching key. Other embodiments store the sorted key-value pairs using specialized data structures that allow efficient access to values matching a given criteria. A call to the get( ) API following the seek( ) call retrieves the key-value pair at the read cursor and increments the read cursor and positions the read cursor on the next key-value pair. Each subsequent call to the get( ) API returns the key-value pair at the cursor and positions the read cursor on the next key-value pair. Since the key-value store 155 stores keys in a sorted order, the seek( ) and the get( ) APIs can be used to retrieve all keys that match a given prefix expression.

In an embodiment, a document comprises a variable length field. The database system 100 determines a fixed length value representing a location of the variable length field. The database system 100 stores the fixed length value in the key-value store instead of the value of the variable length field. Storing fixed-length data values in the key-value store allows the values to be updated efficiently, without requiring data movement. This is so because updating a variable length field from an old value to a new value may require movement of data to make room for the new value if the new value occupies more space than is currently available for storing the old value.

Processing Queries

FIGS. 3-6 describe various processes associated with the database system 100. The steps shown in these processes can be executed in an order different from those shown in the flowcharts. Furthermore, various steps can be executed by module other than those indicated herein.

Figure 3:
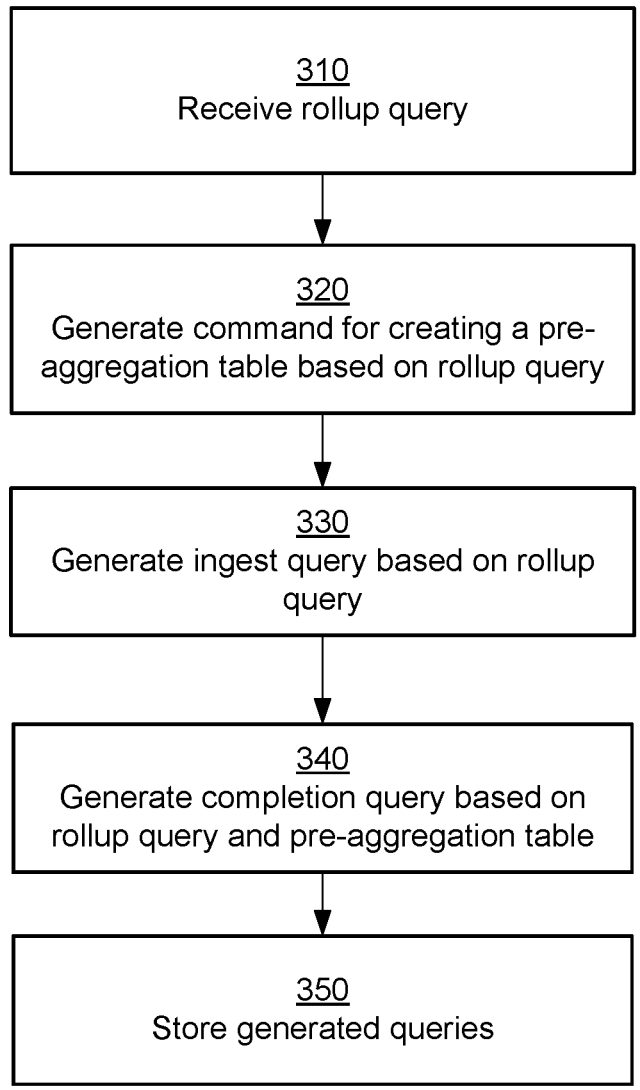
FIG. 3 is a flowchart of the process for generating various commands and queries based on the input database query, in accordance with an embodiment.

FIG. 3 is a flowchart of the process for generating various commands and queries based on a rollup query, in accordance with an embodiment. The database system receives 310 a rollup query. The database system generates 320 a command for creating a pre-aggregation table based on the rollup query. The database system determines the schema of the pre-aggregation table including the various columns and the type of data stored in the pre-aggregation table based on the rollup query. The database system generates a database command for creating the table according to the determined schema. For example, the database system may generate a "CREATE TABLE" command based on the schema of the table.

The database system generates 330 an ingest query based on the rollup query. The ingest query generates records that are saved in the pre-aggregation table. The ingest query performs partial aggregation of the records received by the database system that are processed by the rollup query.

The database system generates 340 a completion query based on the rollup query. The completion query is executed when results of the rollup query are generated. The completion query processes the records of the pre-aggregation table to generate the results of the rollup query.

The database system stores 350 the generated queries for subsequent user, for example, in a metadata table. The database system retrieves the queries, for example, to generate data for the pre-aggregation table or for generating the results of the rollup query.

Figure 4:
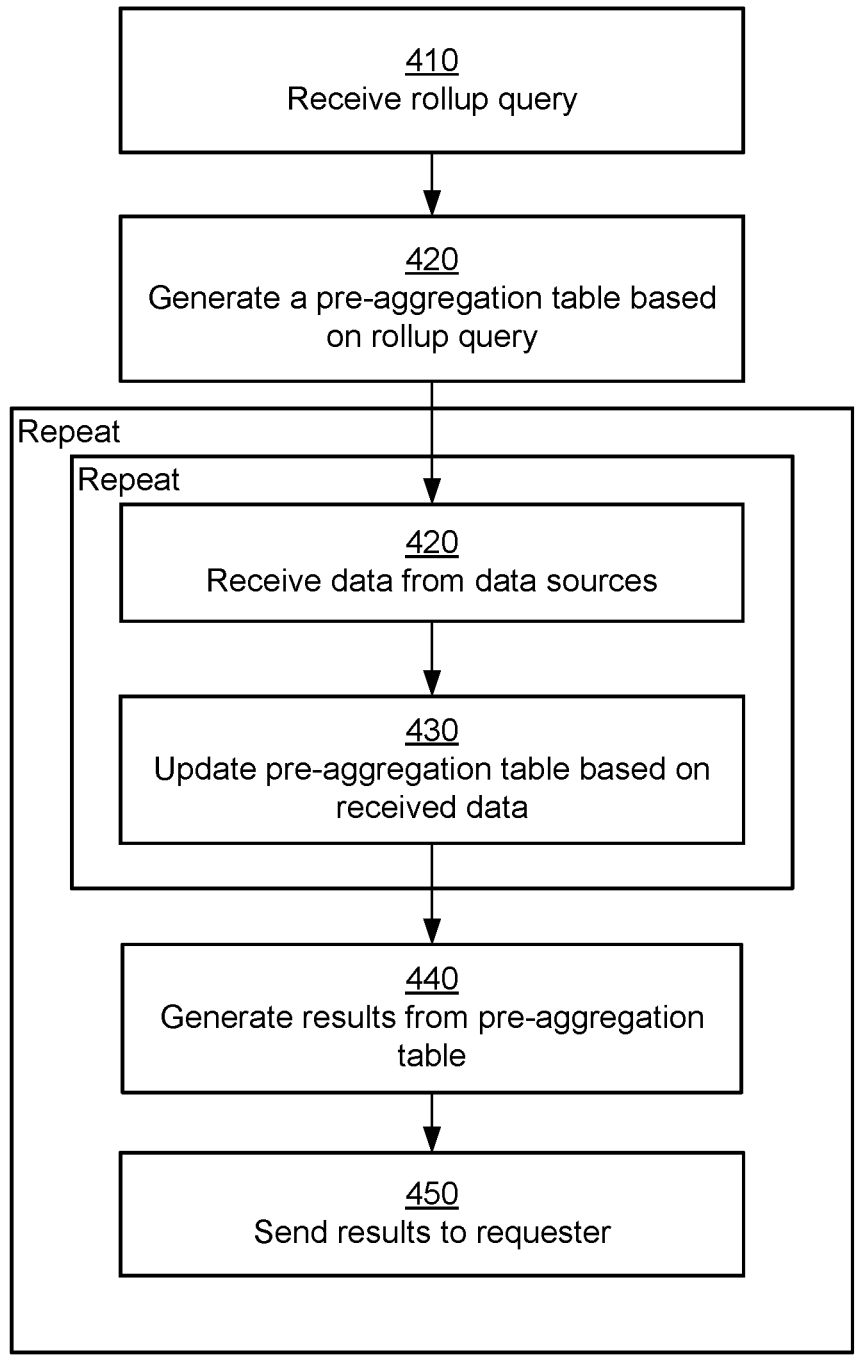
FIG. 4 is a flowchart of the overall process for executing a rollup query, in accordance with an embodiment.

FIG. 4 is a flowchart of the overall process for executing a rollup query, in accordance with an embodiment. The database system receives 410 a rollup query for processing. This step corresponds to step 310 of FIG. 3.

The database system generates 420 a pre-aggregation table based on the rollup query. The database system determines the schema of the pre-aggregation table based on the rollup query. The pre-aggregation table is generated for storing pre-aggregation data generated by an ingest query generated from the rollup query.

The database system repeats the steps 440, and 450 every time the database system generates the results of the rollup query. Furthermore, the database system repeats execution of steps 420 and 430 at a higher frequency compared to the frequency with which results of the rollup query are returned. The database system receives 420 data, for example, records from one or more data sources 120. Periodically, the database system processes the data received within a time interval to update 430 the pre-aggregation table based on the data received during the time interval.

If the database system receives a request for results of the rollup query or if the database system is configured to return results of the rollup query periodically, the database system executes the steps 440, and 450. The database system generates 440 results from the pre-aggregation table by executing the completion query corresponding to the rollup query. The database system sends 450 the results to the requestor.

Figure 5:
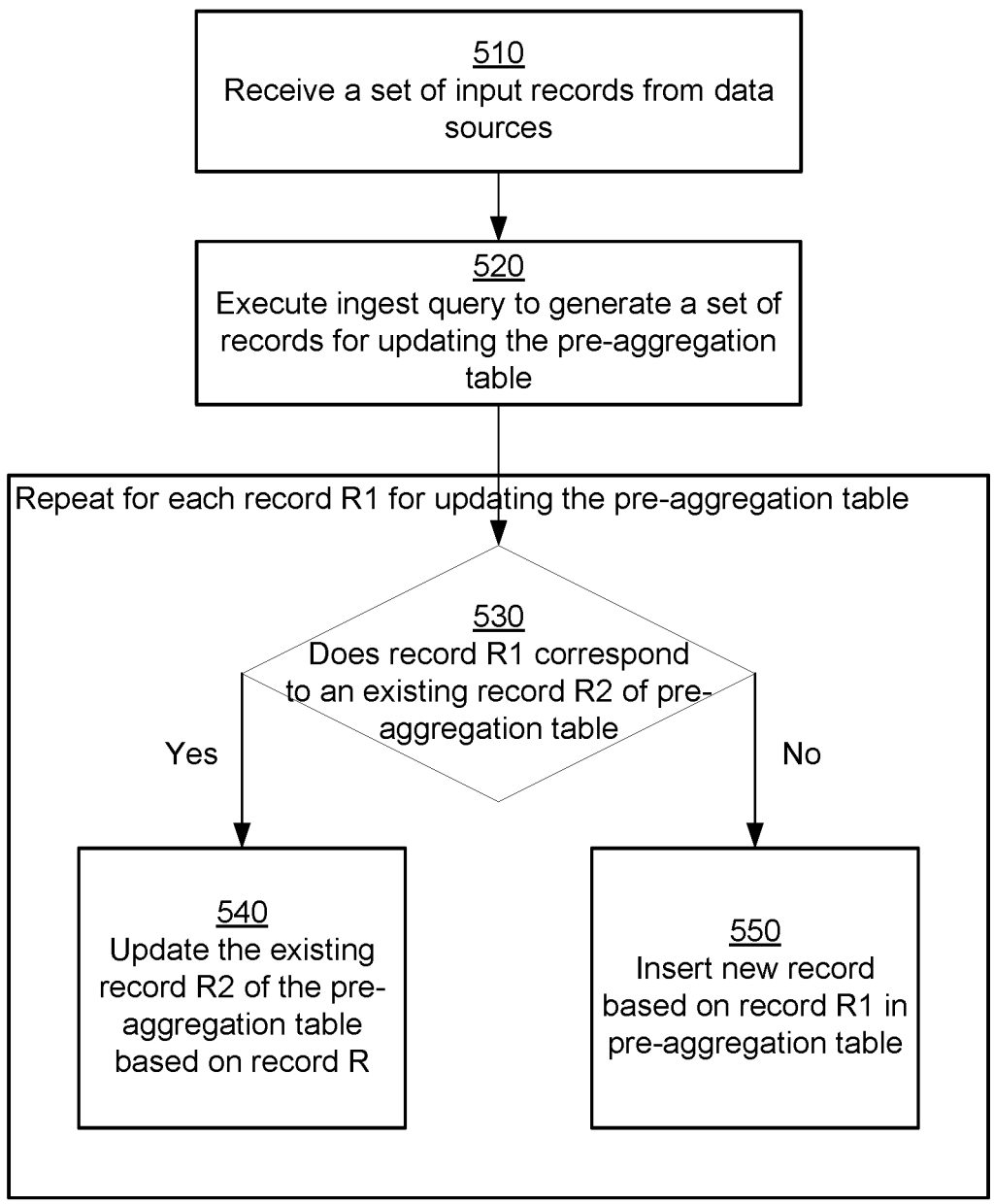
FIG. 5 is a flowchart of the process for populating data in the pre-aggregation table, in accordance with an embodiment.

FIG. 5 is a flowchart of the process for populating data in the pre-aggregation table, in accordance with an embodiment. The database system receives 510 data, for example, a set S1 of records from one or more data sources 120. The database system executes 520 the ingest query corresponding to the rollup query to generate a set S2 of records for updating the pre-aggregation table. The system repeats step 530, 540, and 550 for each record R1 of the set S2 generated for updating the pre-aggregation table. The database system determines 530 whether the record R corresponding to an existing record of the pre-aggregation table. If the record R1 is determined to correspond to an existing record of the pre-aggregation table, the database system updates 540 the existing record R2 of the pre-aggregation table based on the record R1. If the record R1 does not correspond to any existing record of the pre-aggregation table, the database system inserts a new record based on the record R1 in the pre-aggregation table.

In an embodiment, the database system determines whether the record R1 corresponds to an existing record R2 of the pre-aggregation table by comparing certain fields of the records. In particular, the record R1 includes a set of fields corresponding to the grouping dimensions specified in the rollup query. Similarly, the pre-aggregation table includes a set of columns corresponding to the grouping dimensions specified in the rollup query. The database system determines whether the record R1 corresponds to an existing record R2 by matching the fields of the record R1 that correspond to the grouping dimensions with the columns of the pre-aggregation table that correspond to the grouping dimensions.

In an embodiment, the database system compares the grouping dimensions of the pre-aggregation record with the grouping dimensions of rows of the pre-aggregation table by determining a hash value of the grouping dimensions and comparing the hash value. For example, the database system may determine a 128 bit hash value. If the rollup query specifies grouping using columns column1, and column2, the hash value is determined as i28_bit_hash(column1, column2). Accordingly, the database system determines whether the record R1 corresponds to an existing record R2 by comparing a hash value based on the fields of the record R1 that correspond to the grouping dimensions with a hash value based on the columns of the pre-aggregation table that correspond to the grouping dimensions. If the two hash values match, the system determines that the matching record of the pre-aggregation table corresponds to the pre-aggregation record and accordingly updates the values of the existing record R2 based on values of corresponding fields of the pre-aggregation record R1. If the record R1 matches an existing record R2, the database system combines corresponding fields of the records.

According to an embodiment, the database system combines the partial results of aggregate functions. The database system performs a computation for combining partial results of an aggregate function based on the type of aggregate function. For example, if a field of the records R1 and R2 represents a partial result of a SUM aggregate function, the database system adds the field of the record R1 and the field of the record R2 and stores the result as the field of the record R2. If a field of the records R1 and R2 represents a partial result of a MIN (or MAX) aggregate function, the database system determines the minimum (or maximum) value of the field of the record R1 and the field of the record R2 and stores the result as the field of the record R2. A partial result corresponding to an AVERAGE aggregate function is stored as two fields, one storing the SUM value and another storing the COUNT value in the records. The database system combines the partial results by adding the corresponding SUM and COUNT fields and storing as corresponding fields of the record R2.

The ability to update existing records of the pre-aggregation table allows the database system to handle records that may arrive in any order. For example, if there is network failure for a period of time, records from a data source may get buffered during the period and arrive at a later stage. The database system is able to process the records whenever they arrive.

Figure 6:
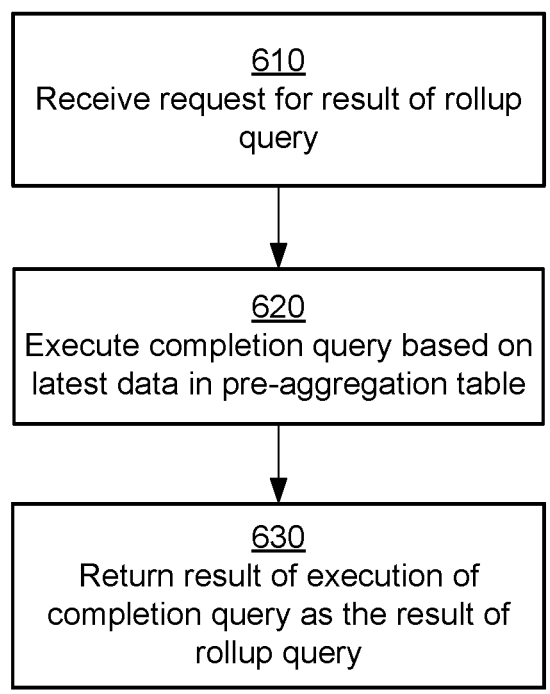
FIG. 6 is a flowchart of the process for returning result of execution of the rollup query, in accordance with an embodiment.

FIG. 6 is a flowchart of the process for returning result of execution of the rollup query, in accordance with an embodiment. The database system receives 610 a request for result of the rollup query. The database system executes 620 the completion query corresponding to the rollup query based on the latest data stored in the pre-aggregation table. The database system returns 630 the result of execution of the completion query as the result of the rollup query. The steps of the process shown in FIG. 6 may be executed periodically. In some embodiments, the database system may execute the steps 620 and 630 without requiring a request to be received. Alternatively, the database system executes the steps 620 and 630 in response to receiving a request as shown in FIG. 6.

The embodiments described herein improve the efficiency of execution of database queries such as rollup queries, for example, for streaming data when the same database query is recomputed periodically as new data is received. The system improves the efficiency of execution of the processing of database queries by calculating pre-aggregation tables that store partially computed results that can be used for recomputing the results of the query. In contrast, existing systems repeat large amount of computation every time a database query is processed, thereby wasting computational power. Accordingly, the system disclosed improves the computational efficiency of the process of execution of database queries based on streaming data received. Furthermore, the system disclosed improves the time it takes to execute the database queries, thereby improving the user experience since the user has to wait less time for the results of the database query. The system splits the processing of the query into a portion of computation (i.e., ingest query) that is performed as new data is received and a portion of computation (i.e., completion query) that is performed when the query result is determined. As a result fewer computations are performed when the final result of the query is determined. Accordingly, the techniques disclosed provide a technical improvement over conventional systems that process such database queries.

Architecture of Computer

Figure 7:
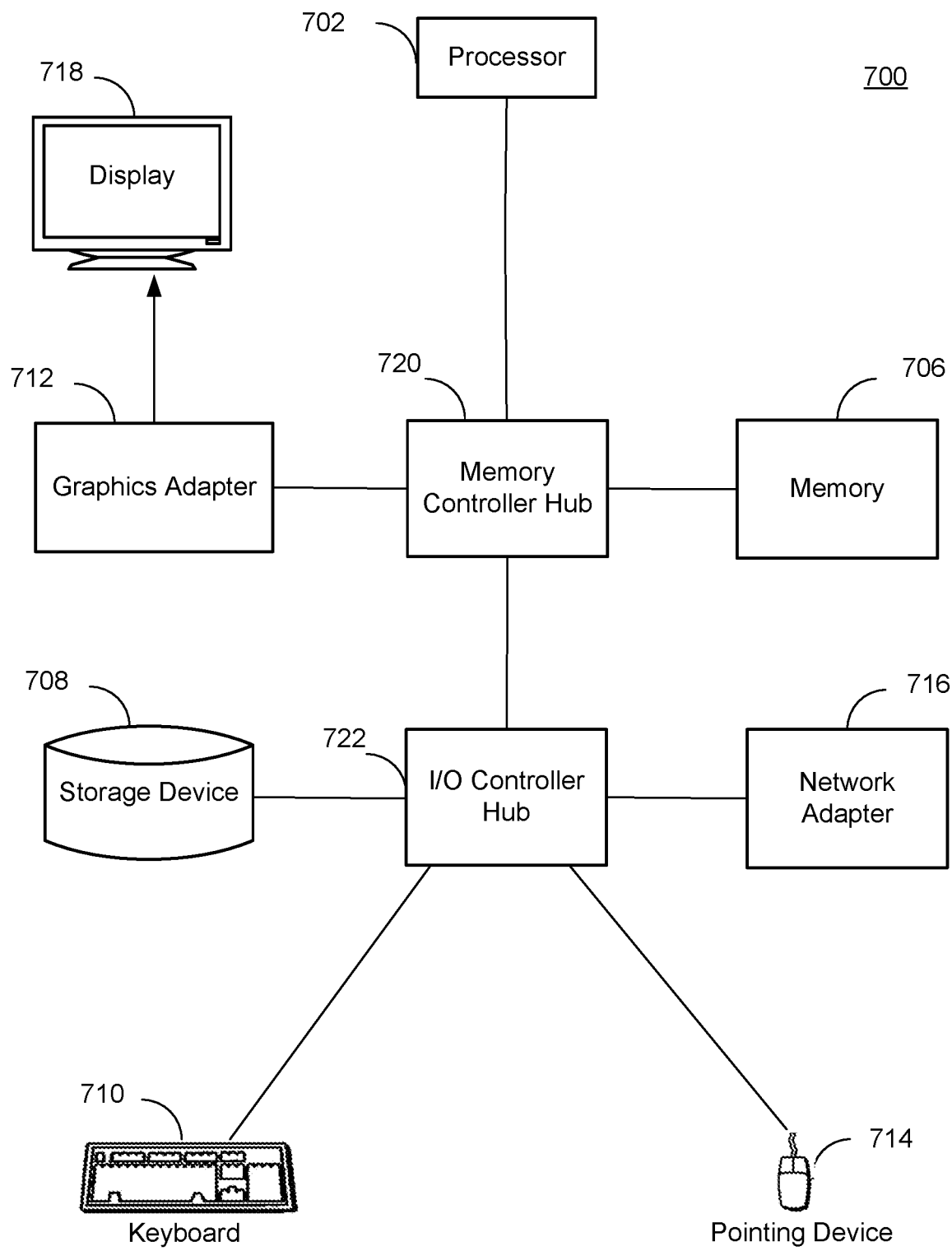
FIG. 7 is a high-level block diagram illustrating an example of a computer for use as one or more of the systems illustrated in FIG. 1, according to one embodiment.

FIG. 7 is a high-level block diagram illustrating an example of a computer 700 for use as one or more of the systems illustrated in FIG. 1, according to one embodiment. Illustrated are at least one processor 702 coupled to a memory controller hub 720, which is also coupled to an input/output (I/O) controller hub 722. A memory 706 and a graphics adapter 712 are coupled to the memory controller hub 722, and a display device 718 is coupled to the graphics adapter 712. A storage device 708, keyboard 710, pointing device 714, and network adapter 716 are coupled to the I/O controller hub. The storage device may represent a network-attached disk, local and remote RAID, or a SAN (storage area network). A storage device 708, keyboard 710, pointing device 714, and network adapter 716 are coupled to the I/O controller hub 722. Other embodiments of the computer 700 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 708 includes one or more non-transitory computer-readable storage media such as one or more hard drives, compact disk read-only memory (CD-ROM), DVD, or one or more solid-state memory devices. The memory holds instructions and data used by the processor 702. The pointing device 714 is used in combination with the keyboard to input data into the computer 700. The graphics adapter 712 displays images and other information on the display device 718. In some embodiments, the display device includes a touch screen capability for receiving user input and selections. One or more network adapters 716 couple the computer 700 to a network. Some embodiments of the computer have different and/or other components than those shown in FIG. 7. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method for processing queries, comprising:
   receiving, by a database system, a request to process records received by the database system, the request specifying a database language query specifying a grouping clause and one or more aggregate result values based on grouping sets generated by the grouping clause;
   generating a pre-aggregation table based on the database language query;
   generating based on the database language query:
      an ingest query configured to generate data for populating the pre-aggregation table, and
      a completion query configured to process data of the pre-aggregation table to obtain results of the database language query;
   repeatedly performing:
      receiving a set of input records,
      executing the ingest query to generate at least one pre-aggregation record from the set of input records, and
      updating the data of the pre-aggregation table based on the at least one pre-aggregation record by determining whether hash values associated with records in the pre-aggregation table correspond with a hash value associated with the at least one pre-aggregation record;
   responsive to updating the data stored in the pre-aggregation table, generating a result set by executing the completion query on the data stored in the pre-aggregation table; and
   sending the result set to a requestor of the results.

2. The computer-implemented method of claim 1, wherein combining the at least one pre-aggregation record with the pre-aggregation table comprises:
   selecting the at least one pre-aggregation record from a set of pre-aggregation records; and
   responsive to determining that there is a record in the pre-aggregation table corresponding to the at least one pre-aggregation record, updating the pre-aggregation table based on the at least one pre-aggregation record.

3. The computer-implemented method of claim 2, wherein determining there is a record in the pre-aggregation table corresponding to the at least one pre-aggregation record comprises identifying the record in the pre-aggregation table that has grouping dimensions that match the grouping dimensions of the at least one pre-aggregation record.

4. The computer-implemented method of claim 3, wherein:
   the hash value associated with the records of the pre-aggregation table are based on the grouping dimensions for the records of the pre-aggregation table; and the hash value associated with the at least one pre-aggregation record are based on the grouping dimensions of the at least one pre-aggregation record.

5. The computer-implemented method of claim 1, further comprising:
selecting the at least one pre-aggregation record from a set of pre-aggregation records; and
responsive to determining that there is not a record in the pre-aggregation table corresponding to the at least one pre-aggregation record, inserting the at least one pre-aggregation record in the pre-aggregation table.

6. The computer-implemented method of claim 1, wherein executing the ingest query on the data stored in the pre-aggregation table is performed in response to receiving a request to provide results of execution of the database language query.

7. The computer-implemented method of claim 1, wherein executing the ingest query on the data stored in the pre-aggregation table is performed periodically at a frequency that is less than the frequency at which the ingest query is executed.

8. The computer-implemented method of claim 1, wherein the database language query specifies a grouping clause that groups by a plurality of dimensions.

9. The computer-implemented method of claim 1, wherein the database language query specifies a grouping clause that groups by at least a dimension other than a time dimension.

10. The computer-implemented method of claim 1, wherein the database language query specifies an expression that combines results of a plurality of aggregate functions, wherein the ingest query evaluates each of the plurality of aggregate functions and stores the result of each aggregate function in the pre-aggregation table and the completion query evaluates the expression based on the results of each aggregate function obtained from the pre-aggregation table.

11. The computer-implemented method of claim 1, wherein the ingest query generates one or more partial result values for each aggregate function.

12. The computer-implemented method of claim 1, wherein if the database language query includes a having clause, the having clause is evaluated by the completion query.

13. A non-transitory computer readable storage medium storing instructions that when executed by one or more computer processors, cause the one or more computer processors to perform steps comprising:
receiving, by a database system, a request to process records received by the database system, the request specifying a database language query specifying a grouping clause and one or more aggregate result values based on grouping sets generated by the grouping clause;
generating a pre-aggregation table based on the database language query;
generating based on the database language query:
an ingest query configured to generate data for populating the pre-aggregation table, and
a completion query configured to process data of the pre-aggregation table to obtain results of the database language query;
repeatedly performing:
receiving a set of input records,
executing the ingest query to generate at least one pre-aggregation record from the set of input records, and
updating the data of the pre-aggregation table based on the at least one pre-aggregation record by determining whether hash values associated with records in the pre-aggregation table correspond with a hash value associated with the at least one pre-aggregation record;
responsive to updating the data stored in the pre-aggregation table, generating a result set by executing the completion query on the data stored in the pre-aggregation table; and
sending the result set to a requestor of the results.

14. The non-transitory computer readable storage medium of claim 13, wherein the instructions further cause the one or more computer processors to perform steps comprising:
selecting the at least one pre-aggregation record from a set of pre-aggregation records; and
responsive to determining that there is a record in the pre-aggregation table corresponding to the at least one pre-aggregation record, updating the pre-aggregation table based on the at least one pre-aggregation record.

15. The non-transitory computer readable storage medium of claim 14, wherein determining there is a record in the pre-aggregation table corresponding to the at least one pre-aggregation record comprises identifying the record in the pre-aggregation table that has grouping dimensions that match the grouping dimensions of the at least one pre-aggregation record.

16. The non-transitory computer readable storage medium of claim 13, wherein the instructions further cause the one or more computer processors to perform steps comprising:
selecting the at least one pre-aggregation record from a set of pre-aggregation records; and
responsive to determining that there is not a record in the pre-aggregation table corresponding to the at least one pre-aggregation record, inserting the at least one pre-aggregation record in the pre-aggregation table.

17. The non-transitory computer readable storage medium of claim 13, wherein the database language query specifies an expression that combines results of a plurality of aggregate functions, wherein the ingest query evaluates each of the plurality of aggregate functions and stores the result of each aggregate function in the pre-aggregation table and the completion query evaluates the expression based on the results of each aggregate function obtained from the pre-aggregation table.

18. A computer system comprising:
one or more computer processors; and
a non-transitory computer readable storage medium storing instructions that when executed by the one or more computer processors, cause the one or more computer processors to perform steps comprising:
receiving, by a database system, a request to process records received by the database system, the request specifying a database language query specifying a grouping clause and one or more aggregate result values based on grouping sets generated by the grouping clause;
generating a pre-aggregation table based on the database language query;
generating based on the database language query:
an ingest query configured to generate data for populating the pre-aggregation table, and
a completion query configured to process data of the pre-aggregation table to obtain results of the database language query;

repeatedly performing:
  receiving a set of input records,
  executing the ingest query to generate at least one pre-aggregation record from the set of input records, and
  updating the data of the pre-aggregation table based on the at least one pre-aggregation record by determining whether hash values associated with records in the pre-aggregation table correspond with a hash value associated with the at least one pre-aggregation record;
responsive to updating the data stored in the pre-aggregation table, generating a result set by executing the completion query on the data stored in the pre-aggregation table; and
sending the result set to a requestor of the results.

19. The computer system of claim 18, wherein the instructions further cause the one or more computer processors to perform steps comprising:

selecting the at least one pre-aggregation record from a set of pre-aggregation records; and responsive to determining that there is a record in the pre-aggregation table corresponding to the at least one pre-aggregation record, updating the pre-aggregation table based on the at least one pre-aggregation record.

20. The computer system of claim 18, wherein the instructions further cause the one or more computer processors to perform steps comprising:

selecting the at least one pre-aggregation record from a set of pre-aggregation records; and responsive to determining that there is not a record in the pre-aggregation table corresponding to the at least one pre-aggregation record, inserting the at least one pre-aggregation record in the pre-aggregation table.

* * * * *